US011907685B2

(12) United States Patent
Holt et al.

(10) Patent No.: US 11,907,685 B2
(45) Date of Patent: Feb. 20, 2024

(54) STRUCTURE AND METHOD FOR RANDOM CODE GENERATION

(71) Applicant: GLOBALFOUNDRIES U.S. Inc., Malta, NY (US)

(72) Inventors: Judson R. Holt, Ballston Lake, NY (US); Julien Frougier, Albany, NY (US); Ryan W. Sporer, Mechanicville, NY (US); George R. Mulfinger, Wilton, NY (US); Daniel Jaeger, Saratoga Springs, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 674 days.

(21) Appl. No.: 16/677,717

(22) Filed: Nov. 8, 2019

(65) Prior Publication Data
US 2021/0141610 A1    May 13, 2021

(51) Int. Cl.
*H04L 9/32*    (2006.01)
*G06F 7/58*    (2006.01)
(Continued)

(52) U.S. Cl.
CPC .............. *G06F 7/588* (2013.01); *G06F 21/00* (2013.01); *G06F 21/72* (2013.01); *G06F 21/73* (2013.01);
(Continued)

(58) Field of Classification Search
CPC . H01L 21/02233; G06F 7/588; H04L 9/3278; H04L 2209/12
See application file for complete search history.

(56) References Cited

U.S. PATENT DOCUMENTS

| 6,767,835 B1 | 7/2004 | Nariman et al. |
| 7,402,850 B2 | 7/2008 | Bhattacharya |

(Continued)

FOREIGN PATENT DOCUMENTS

| CN | 107078162 A | 8/2017 |
| CN | 107863335 A | 3/2018 |

OTHER PUBLICATIONS

Aishwarya Bahudhanam Venkatasubramaniyan, "Physically Unclonable Functions Based on Voltage Divider Arrays of MOSFETs Operating in Subthreshold Region", Thesis, University of Buffalo, Department of Electrical Engineering, 2018, pp. 1-62.
(Continued)

*Primary Examiner* — Ellen Tran
(74) *Attorney, Agent, or Firm* — Francois Pagette; Hoffman Warnick LLC

(57) ABSTRACT

Disclosed is a structure for implementing a Physically Unclonable Function (PUF)-based random number generator and a method for forming the structure. The structure includes same-type, same-design devices in a semiconductor layer. While values of a performance parameter exhibited by some devices (i.e., first devices) are within a range established based on the design, values of the same performance parameter exhibited by other devices (i.e., second devices) is outside that range. A random distribution of the first and second devices is achieved by including randomly patterned dopant implant regions in the semiconductor layer. Each first device is separated from the dopant implant regions such that its performance parameter value is within the range and each second device has a junction with dopant implant region(s) such that its performance parameter value is outside the range or vice versa. A random number generator can be operably connected to the devices to generate a PUF-based random number.

20 Claims, 10 Drawing Sheets

(51) Int. Cl.
  *H04L 9/08* (2006.01)
  *G06F 21/00* (2013.01)
  *G06F 21/73* (2013.01)
  *G06F 21/72* (2013.01)
  *G06F 21/76* (2013.01)
  *H01L 21/02* (2006.01)
  *H01L 27/088* (2006.01)
(52) U.S. Cl.
  CPC ........ *G06F 21/76* (2013.01); *H01L 21/02233* (2013.01); *H04L 9/0866* (2013.01); *H04L 9/3278* (2013.01); *H01L 27/088* (2013.01); *H04L 2209/12* (2013.01)

(56) References Cited

U.S. PATENT DOCUMENTS

| | | | |
|---|---|---|---|
| 8,407,656 B2 | 3/2013 | Hook et al. | |
| 8,861,736 B2 | 10/2014 | BrightSky et al. | |
| 9,025,386 B1 | 5/2015 | Iyer et al. | |
| 9,337,837 B2 | 5/2016 | Pfeiffer et al. | |
| 9,355,739 B2 | 5/2016 | Castalino et al. | |
| 9,391,030 B1 | 7/2016 | Li et al. | |
| 9,418,745 B1 | 8/2016 | Chen et al. | |
| 9,589,658 B1 | 3/2017 | Agarwal et al. | |
| 9,923,046 B1 | 3/2018 | Zang et al. | |
| 9,947,391 B1 | 4/2018 | Mahatme et al. | |
| 9,953,727 B1 | 4/2018 | Fifield et al. | |
| 10,103,895 B1 | 10/2018 | Tseng et al. | |
| 2012/0326752 A1* | 12/2012 | Hook | H01L 23/544 327/63 |
| 2013/0234771 A1 | 9/2013 | Simons et al. | |
| 2014/0279532 A1* | 9/2014 | Tremlet | G09C 1/00 705/325 |
| 2015/0154421 A1 | 6/2015 | Feng et al. | |
| 2016/0284647 A1* | 9/2016 | Cao | H01L 29/78 |
| 2016/0329287 A1 | 11/2016 | Li et al. | |
| 2017/0263575 A1* | 9/2017 | Cao | H04L 9/3278 |
| 2018/0233216 A1 | 8/2018 | Fifield et al. | |
| 2020/0065068 A1* | 2/2020 | Hekmatshoartabari | H04L 9/0869 |

OTHER PUBLICATIONS

Herder et al., "Physical Unclonable Functions and Applications: A Tutorial", Proceedings of IEEE, vol. 102, No. 8, 2014, pp. 1126-1141.

Fatemeh Tehranipoor, "Design and Architecture of Hardware-Based Random Function Security Primitives", Doctoral Dissertations 1512, University of Connecticut, 2017, pp. 1-201.

* cited by examiner

STRUCTURE AND METHOD FOR RANDOM CODE GENERATION

BACKGROUND

Field of the Invention

The present invention relates to generating a random number (e.g., a random code or key) and, more particularly, to a structure for implementing a Physically Unclonable Function (PUF)-based random number generator and a method for forming the structure.

Description of Related Art

With the ever-increasing use of Internet of Things (IoT) objects, wireless communications and data are becoming more and more vulnerable to a wide range of security threats and the previously employed software-based techniques used to counter such security threats are no longer sufficient. Recently, Physically Unclonable Function (PUF)-based random number generators have been developed to provide random keys (i.e., random codes) for cryptography (e.g., encryption and decryption), advanced authentication, etc. A PUF-based random number generator is not implemented in software but instead is implemented in hardware hidden on a chip. Specifically, a PUF-based random number generator is an on-chip physical entity. An exemplary PUF-based random number generator includes an array of devices and circuitry that is operably connected to those devices for detecting performance variations (e.g., threshold voltage variations in an array of field effect transistors (FETs), resistance variations in an array of resistors, etc.) that are the result of random process variations, which occur naturally during manufacturing. Such performance variations can be employed to generate and output a random multi-bit binary number. For example, a random number generator could be configured to test the devices. For those devices where a performance parameter value is above specific value a bit value of "1" could be output, whereas for those devices where the performance parameter is below the specific value a bit value of "0" could be output. Ideally, this random multi-bit binary number can be repeatedly and consistently generated (i.e., always the same and not re-writable). However, manufacturing process flows are typically designed to minimize process variations and if/when the naturally occurring process variations result in a relatively small range of performance variations across the array and further if/when this range is subject to change depending upon the operating conditions (e.g., with varying temperatures and/or varying operating voltages), it can be difficult to ensure that the same random binary number is repeatedly and consistently generated. That is, the state of each device may change with variations in temperature and/or voltage conditions.

SUMMARY

Disclosed herein are embodiments of a structure for implementing a Physically Unclonable Function (PUF)-based random number generator. The disclosed embodiments of the structure can include a semiconductor layer and an array of devices, which are formed at least partially in the semiconductor layer. The devices can all be the same type of device and can all be formed according to the same specific design. However, while values of a performance parameter exhibited by some of the devices in the array (referred to herein as first devices) are within a predetermined range (e.g., a range established based on the design of the devices), values for the same performance parameter exhibited by other devices in the array (referred to herein as second devices) are outside that predetermined range. These first and second devices can be randomly distributed across the array. Random distribution of the first and second devices can be achieved in the disclosed embodiment of the structure by, for example, including randomly patterned dopant implant regions in the semiconductor layer. Each first device can be physically separated from the dopant implant regions such that its performance parameter value is within the range, whereas each second device can have a junction with one or more dopant implant regions and the junction(s) can result in its performance parameter value being outside the range or vice versa. Some embodiments of the structure can further include a random number generator, which is operably connected to the array of devices and configured to take advantage of the significantly different performance parameter values of the first and second devices (which are randomly distributed) in order to generate a PUF-based random number.

Also disclosed herein are embodiments of a method of forming the above-described structure for implementing a Physically Unclonable Function (PUF)-based random number generator. The disclosed embodiments of the method can include providing a semiconductor layer; and forming an array of devices using the semiconductor layer. The devices can all be the same type of device formed according to the same specific design. However, they can further be formed so that, while values of a performance parameter exhibited by some of the devices in the array (referred to herein as first devices) are within a predetermined range (e.g., a range established based on the design of the devices), values of the same performance parameter exhibited by other devices in the array (referred to herein as second devices) are outside that predetermined range. These first and second devices can be randomly distributed across the array. Formation and random distribution of the first and second devices can be achieved in the disclosed embodiment of the method by, for example, forming randomly patterned dopant implant regions in the semiconductor layer. These randomly patterned dopant implant regions can be formed before or during device formation. Various different techniques could be employed to form the randomly patterned dopant implant regions (as discussed further in the detailed description section below). In any case, devices that end up physically separated from the dopant implant regions can have performance parameter values within the predetermined range such that they are the first devices, whereas devices that end up with a junction with one or more dopant implant regions can have performance parameter values outside that range such that they are the second devices (or vice versa). Some embodiments of the method can further include forming a random number generator, which is operably connected to the array of devices and configured to take advantage of the significantly different performance parameter values of the first and second devices (which are randomly distributed) in order to generate a PUF-based random number.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, with the ever-increasing use of Internet of Things (IoT) objects, wireless communications and data are becoming more and more vulnerable to a wide range of security threats and the previously employed software-based techniques used to counter such security threats are no longer sufficient. Recently, Physically Unclonable Function (PUF)-based random number generators have been developed to provide random keys (i.e., random codes) for cryptography (e.g., encryption and decryption), advanced authentication, etc. A PUF-based random number generator is not implemented in software but instead is implemented in hardware hidden on a chip. Specifically, a PUF-based random number generator is an on-chip physical entity. An exemplary PUF-based random number generator includes an array of devices and circuitry that is operably connected to those devices for detecting performance variations (e.g., threshold voltage variations in an array of field effect transistors (FETs), resistance variations in an array of resistors, etc.) that are the result of random process variations, which occur naturally during manufacturing. Such performance variations can be employed to generate and output a random multi-bit binary number. For example, a random number generator could be configured to test the devices. For those devices where a performance parameter value is above specific value a bit value of "1" could be output, whereas for those devices where the performance parameter is below the specific value a bit value of "0" could be output. Ideally, this random multi-bit binary number can be repeatedly and consistently generated (i.e., always the same and not re-writable). However, manufacturing process flows are typically designed to minimize process variations and if/when the naturally occurring process variations result in a relatively small range of performance variations across the array and further if/when this range is subject to change depending upon the operating conditions (e.g., with varying temperatures and/or varying operating voltages), it can be difficult to ensure that the same random binary number is repeatedly and consistently generated. That is, the state of each device may change with variations in temperature and/or voltage conditions.

Figure 1:
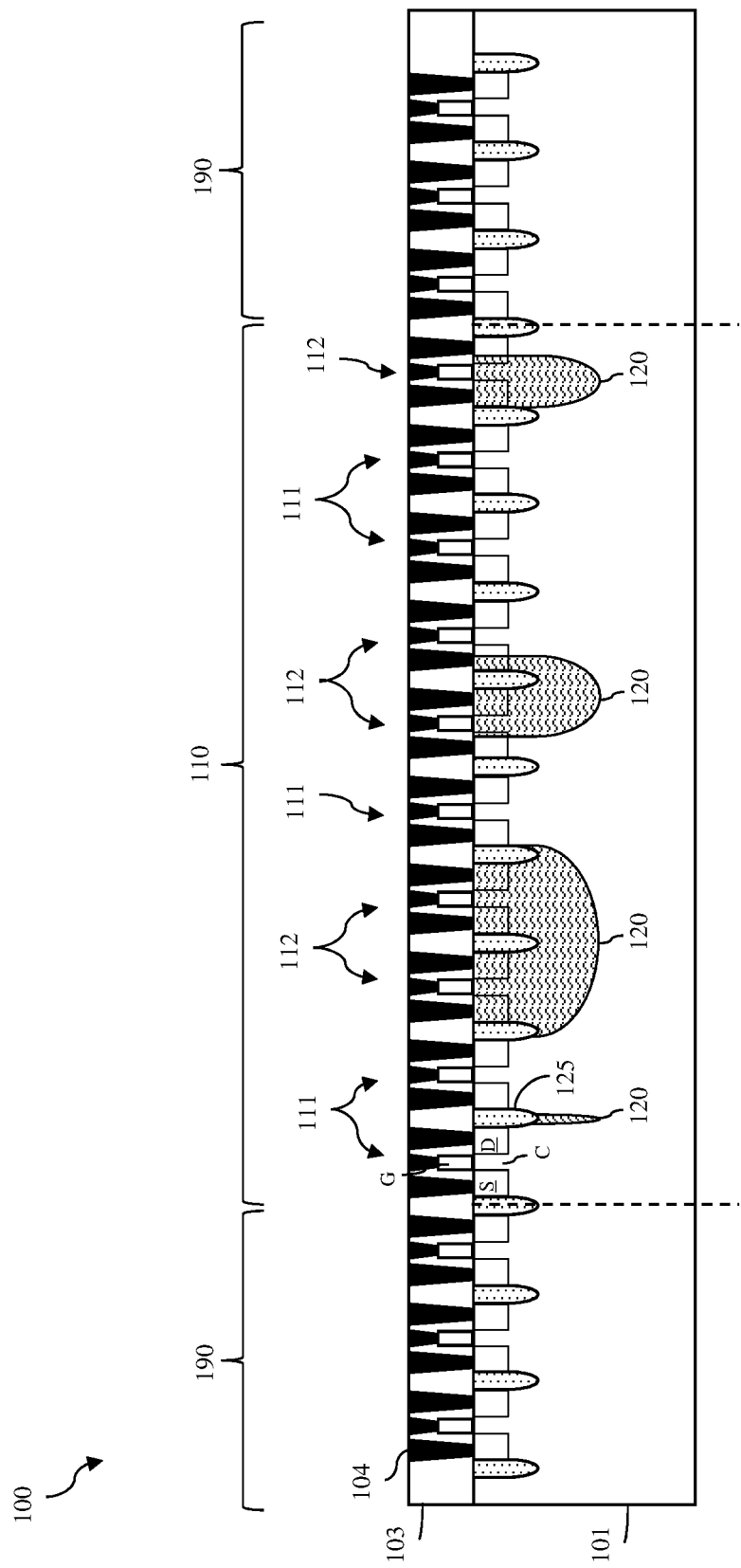
FIG. 1 is a cross-section diagram illustrating an embodiment of on-chip structure for implementing a Physically Unclonable Function (PUF)-based random number generator.
Figure 2:
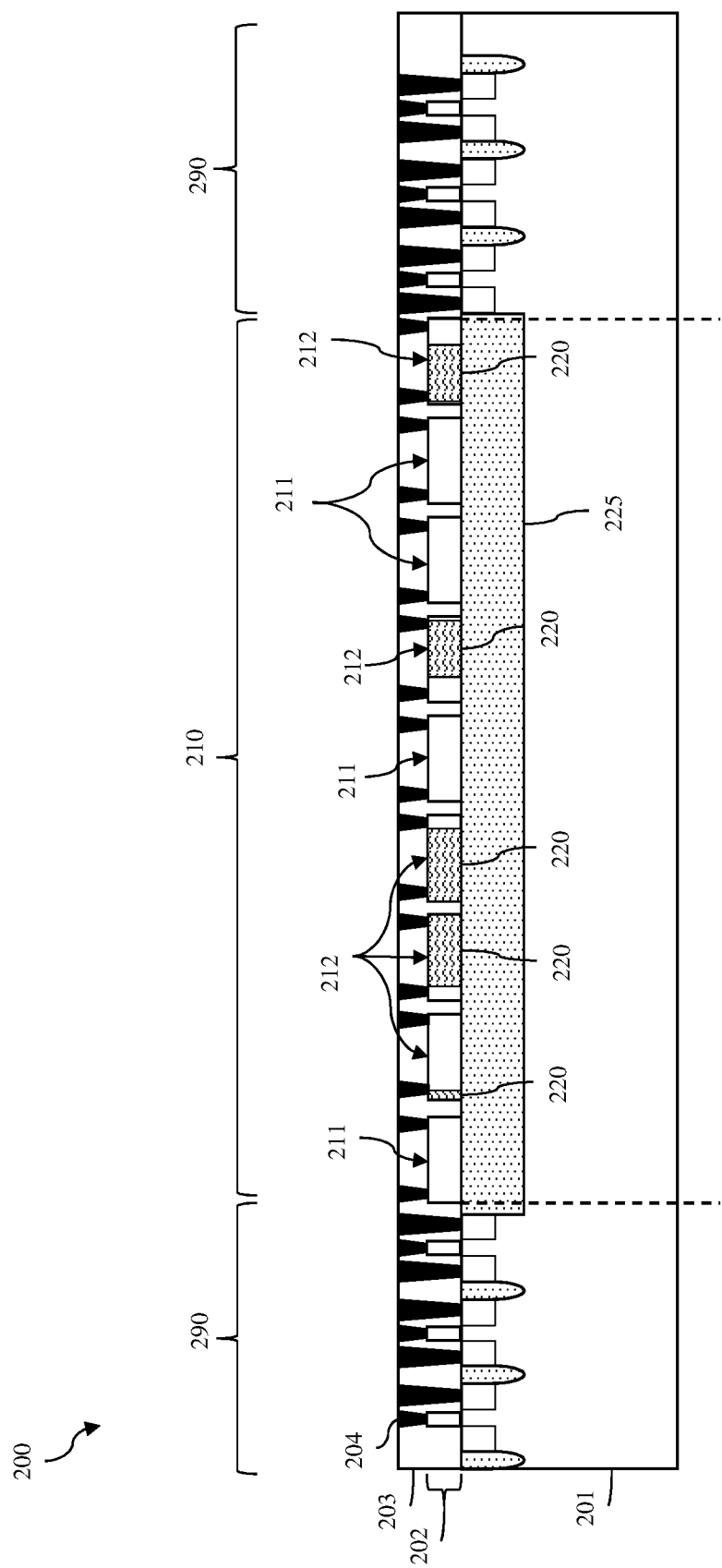
FIG. 2 is a cross-section diagram illustrating another embodiment of on-chip structure for implementing a Physically Unclonable Function (PUF)-based random number generator.

In view of the foregoing, disclosed herein are embodiments of an on-chip structure for implementing a Physically Unclonable Function (PUF)-based random number generator and a method for forming the structure (see the on-chip structure 100 of FIGS. 1 and 200 of FIG. 2).

This structure 100, 200 can include a semiconductor layer and an array 110, 210 of devices, which are formed at least partially in the semiconductor layer. The devices in the array 110, 210 can all be the same type of device (e.g., a field effect transistor, resistor, or any other suitable device) and can all be formed according to the same specific design for that device. However, while the values of a performance parameter that are exhibited by some of the devices in the array 110, 210 (referred to herein as first devices 111, 211) are within a predetermined range (e.g., a range established based on the design of the devices), the values of the same performance parameter exhibited by other devices in the array 110 (referred to herein as second devices 112, 212) will be outside that predetermined range. Additionally, the first and second devices 111-112, 211-212 are randomly distributed across the array 110, 210. Random distribution of the first and second devices 111-112, 211-212 is achieved in the structure 100, 200 by, for example, including randomly patterned dopant implant regions 120, 220 in the semiconductor layer. As illustrated, each first device 111, 211 can be physically separated from the randomly patterned dopant implant regions 120, 220 such that its performance parameter value is within the predetermined range and each second device 112, 212 can have a junction with (i.e., can contain all or a portion of or can be wholly or partially contained in) one or more dopant implant regions 120, 220 and the junction(s) can result in its' performance parameter value being outside the range. Alternatively, each first device 111, 211 can have a junction with one or more dopant implant regions 120, 220 and the junction(s) can result in its' performance parameter value being within the predetermined range and each second device 112, 212 can be physically separated from the randomly patterned dopant implant regions 120, 220 such that its performance parameter value is outside the predetermined range.

Referring specifically to the on-chip structure 100 of FIG. 1. The structure 100 can include a semiconductor layer 101. This semiconductor layer 101 can be a bulk monocrystalline semiconductor substrate (e.g., a bulk silicon substrate or any other suitable bulk monocrystalline semiconductor substrate), as shown. Alternatively, this semiconductor layer 101 could be a monocrystalline semiconductor layer (e.g., a monocrystalline silicon layer or any other suitable monocrystalline semiconductor layer) of a semiconductor-on-insulator structure (e.g., a silicon-on-insulator (SOI) structure).

The structure 100 can further include an array 110 of devices and, particularly, an array of field effect transistors (FETs) hidden amongst other chip components 190 (e.g., between logic blocks, etc.) The FETs can all have been formed according to the same specific design and process flow. This specific design can indicate, for example, the type conductivity (i.e., n-type FET (NFET) or p-type FET (PFET)), source/drain dopant implant concentrations, the channel length, the channel width, etc. In any case, each FET can include shallow trench isolation (STI) regions 125, which are formed in the semiconductor layer 101 and which define the limits of the active region of each FET. Each FET can further include, within a corresponding active device region in the semiconductor layer 101, a source region (S), a drain region (D) and a channel region (C) positioned laterally between the source region (S) and the drain region (D). Each FET can further include a gate structure (G) on at least one surface of the semiconductor layer 101 adjacent to the channel region (C).

For an array 110 of FETs, the threshold voltage range can be predetermined based on the specific design that is used to form those FETs and that threshold voltage range can be employed to distinguish between first FETs 111 and second FETs 112. The outer limits of the predetermined threshold voltage range can be, for example, a lowest threshold voltage associated with a fast device (e.g., a 3 or 6 sigma fast device) formed according to the specific design and a highest threshold voltage associated with a slow device (e.g., a 3 or 6 sigma slow device) formed according to the specific design. The threshold voltage values that are exhibited by some of the FETs in the array 110 (referred to herein as first FETs 111) will be within the predetermined threshold voltage range established based on the specific design of the FETs, whereas the threshold voltage values that are exhibited by other FETs in the array 110 (referred to herein as second FETs 112) will be outside that predetermined threshold voltage range. Random distribution of these first and second FETs is achieved in the structure 100 by including randomly patterned dopant implant regions 120 within the semiconductor layer 101. As illustrated, each first FET 111 is physically separated from the dopant implant regions 120 such that its threshold voltage value is within the predetermined threshold voltage range and each second FET 112 has a junction with one or more dopant implant regions 120. For example, all or portion of the channel region (C) and/or one or both of the source and drain regions (S and D) in each second FET 112 can be formed within a dopant implant region 120. As a result of the junction(s), the threshold voltage value of the FET can fall outside the threshold voltage range.

In some embodiments, all the FETs in the array 110 of the structure 100 could be designed to have a first type conductivity and the dopant implant regions 120 that overlap the second FETs 112 could also have the first type conductivity. For example, all the FETs in the array could be designed as NFETs with N+ source/drain regions and a P- or intrinsic channel region and the dopant implant regions 120 could be doped so as to have N-type conductivity at a relatively high conductivity level. N-type doping of the channel region (C) of an NFET can significantly lower the threshold voltage of the NFET so that it's outside the normal threshold voltage range and, potentially, lower it so much that the NFET is no longer functional. Alternatively, all the FETs in the array 110 could be designed as PFETs with P+ source/drain regions and an N- or intrinsic channel region and the dopant implant regions 120 could be doped so as to have P-type conductivity at a relatively high conductivity level. P-type doping of the channel region (C) of a PFET can significantly lower the threshold voltage of the PFET so that it's outside the normal threshold voltage range and, potentially, lower it so much so that the PFET is no longer functional. Doping of the source and/or drain region in this manner to increase or decrease conductivity can also impact threshold voltage and/or device performance.

In other embodiments, all the FETs in the array 110 could be designed to have a first type conductivity and the dopant implant regions 120 that overlap the second FETs 112 could have a second type conductivity that is different from the first type conductivity. For example, all the FETs in the array 110 could be designed as NFETs with N+ source/drain regions and a P- or intrinsic channel region and the dopant implant regions 120 could be doped so as to have P-type conductivity at a relatively high conductivity level. P-type doping of the channel region (C) of an NFET can significantly increase the threshold voltage of the NFET so that it's outside the normal threshold voltage range and, potentially, increase it so much so that the NFET is no longer functional. Alternatively, all the FETs in the array could be designed as PFETs with P+ source/drain regions and an N- or intrinsic channel region and the dopant implant regions 120 could be doped so as to have N-type conductivity at a relatively high conductivity level. N-type doping of the channel region (C) of a PFET can significantly increase the threshold voltage of the PFET so that it's outside the normal threshold voltage range and, potentially, increase it so much so that the PFET is no longer functional. Doping of the source and/or drain region in this manner to increase or decrease conductivity can also impact threshold voltage and/or device performance.

As discussed in greater detail below with regard to the method embodiments, these dopant implant regions 120 can be randomly patterned due to the techniques used to form mask shapes prior to the dopant implantation process. As a result, the sizes (including lengths, widths and potentially depths), shapes, and locations of the dopant implant regions 120 vary (i.e., are non-uniform) within the on-chip structure 100 and the separation distances (i.e., spacings) between the dopant implant regions 120 also vary. That is, the dopant implant regions 120 are inconsistently sized, inconsistently shaped and inconsistently spaced with respect to each another and with respect to other components in the structure. Furthermore, the inconsistencies of the sizes, the shapes and the locations of the dopant implant regions are not mirrored or repeated from location to location across the structure but instead are inconsistent for any given length measure. This is in contrast with the uniformity of sizes and spacing between other components of the structure. Thus, the locations of the second FETs 112 within the array 110 will also vary.

Referring specifically to the on-chip structure 200 of FIG. 2. The structure 200 can include a semiconductor layer 201. This semiconductor layer 201 can be a bulk monocrystalline semiconductor substrate (e.g., a bulk silicon substrate or any other suitable bulk monocrystalline semiconductor substrate), as shown. Alternatively, this semiconductor layer 201 could be a monocrystalline semiconductor layer (e.g., a monocrystalline silicon layer or any other suitable monocrystalline semiconductor layer) of a semiconductor-on-insulator structure (e.g., a silicon-on-insulator (SOI) structure). The structure 200 can further include an additional semiconductor layer 202 above the semiconductor layer 201. The additional semiconductor layer 202 can be, for example, the polysilicon layer that is typically employed during processing for gate or sacrificial gate formation.

The structure 200 can further include an array 210 of devices and, particularly, an array of polysilicon resistors hidden amongst other chip components 290 (e.g., between logic blocks, etc.). The polysilicon resistors can all have been formed in the additional semiconductor layer 202 according to the same specific design and process flow. This specific design can indicate, for example, the size of the resistors (i.e., length, width, and depth) and any doping. For an array 210 of polysilicon resistors, the resistance range can be predetermined based on the specific design that is used to form those resistors and that resistance range can be employed to distinguish between first resistors 211 and second resistors 212. The outer limits of the predetermined resistance range can be, for example, lowest and highest resistances associated with polysilicon resistors formed according to the specific design. The resistance values that are exhibited by some of the polysilicon resistors in the array 210 (referred to herein as first resistors 211) will be within the predetermined resistance range established based on the specific design of the resistors, whereas the resistance values that are exhibited by other resistors in the array 210 (referred to herein as second resistors 212) will be outside that predetermined resistance range. Random distribution of these first and second resistors is achieved in the structure 200 by including randomly patterned dopant implant regions 220 within the additional semiconductor layer 202 in the region within which the resistors are patterned. Depending upon the resistor material and the dopant used to form the dopant implant regions, each first resistor 211 can be devoid of any dopant implant regions 220 such that its resistance value is within the predetermined resistance range and each second resistor 212 can contain one or more dopant implant regions 220 such that resistance value of the resistor falls outside the predetermined resistance range. Alternatively, each first resistor can include dopant implant region(s) such that its resistance value is within the predetermined resistance range and each second resistor can be devoid of such dopant implant regions such that its resistance value falls outside the predetermined resistance range.

In some embodiments, the specific design for the polysilicon resistors in the array 210 can specify that the resistors are to be undoped (i.e., intrinsic) and the dopant implant regions 220 in the second resistors 212 can have one type of conductivity or the other (i.e., N-type or P-type), thereby increasing the conductivity and decreasing the resistivity of the resistor.

In some embodiments, the specific design for the polysilicon resistors in the array 210 can specify that the resistors are to have a first type conductivity and the dopant implant regions 220 in the second resistors 212 can also have the first type conductivity, thereby increasing the conductivity and decreasing the resistivity of the resistor. Thus, for example, N− second resistors 212 could include N+ dopant implant regions 220 for increased conductivity and decreased resistivity. Alternatively, P− second resistors 212 could include P+ dopant implant regions 220 for increased conductivity and decreased resistivity.

In some embodiments, the specific design for the polysilicon resistors in the array 210 can specify that the resistors are to have a first type conductivity and the dopant implant regions 220 in the second resistors 212 can have a second type conductivity that is different from the first type conductivity, thereby forming a diode that increases the resistivity and decreases the conductivity of the resistor. Thus, for example, N+ second resistors 212 could include P+ dopant implant regions 220, thereby forming a diode for increased resistivity. Alternatively, P+ second resistors 212 could include N+ dopant implant regions 220, thereby forming a diode for increased resistivity.

In any case in each of the the disclosed structures, the dopant implant regions 120, 220 can be randomly patterned due to the techniques used to form mask shapes prior to the dopant implantation process (as discussed in greater detail below with regard to the method embodiments). As a result, the sizes, shapes, and locations of the dopant implant regions 120, 220 will vary (i.e., be non-uniform) within the on-chip structure 100, 200. Thus, the locations of the second devices 112, 212 within the array 110, 210 will also vary.

It should be understood that the embodiments of the structure described in detail above and illustrated in FIGS. 1 and 2 are not intended to be limiting. Alternative embodiments of the structure could include an array of some other type of devices (e.g., diodes, other types of transistors, capacitors, etc. as opposed to FETs or resistors) as long as performance parameter values of random ones of those devices could be significantly altered due to randomly patterned dopant implant regions within a semiconductor layer.

Referring again to the disclosed embodiments of the structure 100 of FIG. 1 and 200 of FIG. 2 in combination, each structure 100, 200 can further further include one or more layers of interlayer dielectric (ILD) material 103, 203 over the array 110, 210 of devices and middle of the line (MOL) contacts 104, 204 that extend essentially vertically through the ILD material 103, 203 to nodes of the devices 111-112, 211-212.

Figure 3:
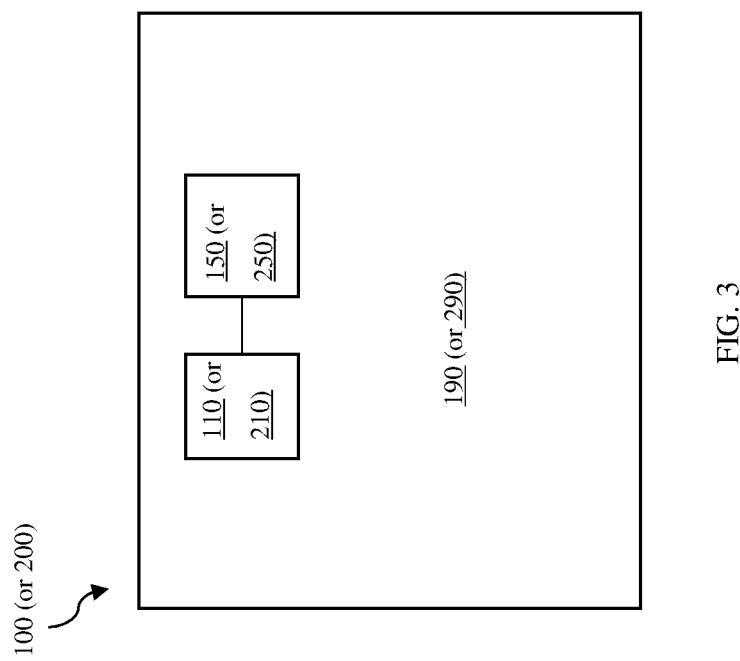
FIG. 3 is a schematic diagram illustrating the on-chip structure of FIG. 1 or FIG. 2 further including a random number generator.

FIG. 3 is a schematic diagram illustrating the on-chip structure 100 (or alternatively the on-chip structure 200), which can further include a random number generator 150, 250. This random number generator 150, 250 can be operably connected to the array 110, 210 of devices (e.g., via the MOL contacts 104, 204 and upper level wiring (not shown)). This random number generator 150, 250 can further be configured to take advantage of the significantly different performance parameter values of the first and second devices (which, as discussed above, are randomly distributed) in order to generate a PUF-based random multi-bit binary number.

For example, each device at each location in the array 110, 210 can correspond to a given bit position in the random multi-bit random number. The random number generator 150, 250 can be configured to test each specific device in the array 110, 210, individually, in order to determine whether the performance parameter value exhibited by that specific device is within the predetermined range or outside the predetermined range. The random number generator 150 can further be configured to output a 0-value bit for the specific bit position when the performance parameter value exhibited by the specific device is within the predetermined range or a 1-value bit for the specific bit position when the performance parameter value exhibited by the specific device is outside the predetermined range (or vice versa). Alternatively, any other random number generator configured to generate a multi-bit random number from an array of devices with detectable performance variations (e.g., a ring oscillator-based random number generator or the like). Such random number generators are well known in the art and, thus, the details thereof have been omitted from this specification in order to allow the reader to focus on the salient aspects of the disclosed embodiments.

In any case, the random multi-bit binary number generated by the random number generator 150, 250 can be repeatedly and consistently generated (i.e., stable, always the same and not re-writable) (not because of the random number generator itself) but rather because in the disclosed embodiments of the structure 100, 200 the randomly patterned dopant implant regions 120, 220 ensure that the differences in the performance parameter values exhibited by the first and second devices 111-112, 211-212 (which are randomly distributed across the array 110, 210) are significantly large, thereby ensuring that the state of each device will remain the same (i.e., first devices 111, 211 will remain first devices and second devices 112, 212 will remain second devices 112) and readily detectable even with variations in temperature and/or voltage conditions. Thus, the random multi-bit binary number can be employed as a random key (i.e., a random code) for cryptography (e.g., encryption and decryption), for advanced authentication, etc.

Figure 4:
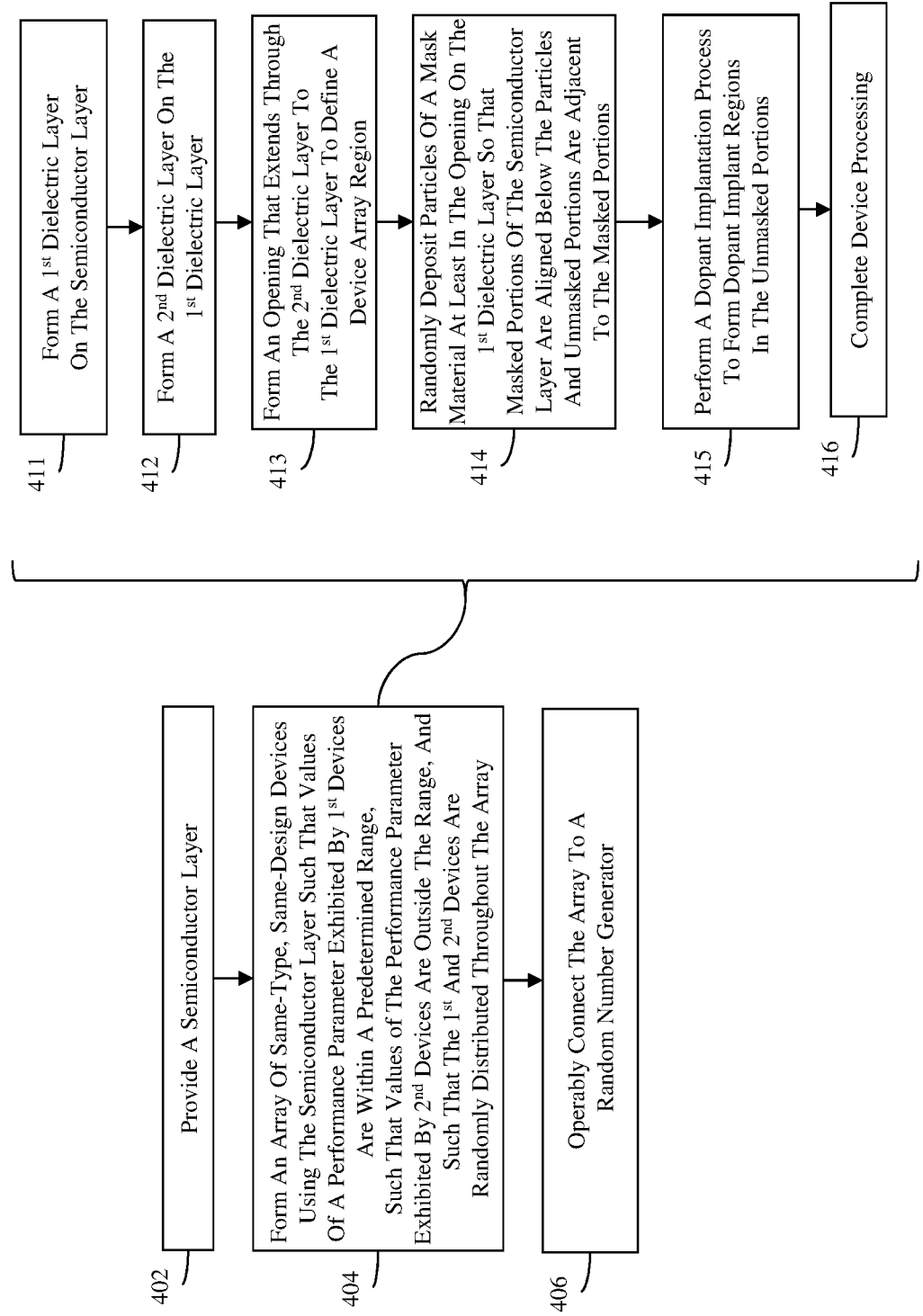
FIG. 4 is a flow diagram illustrating a method for forming the on-chip structure of FIG. 1 or FIG. 2.

Referring to the flow diagram of FIG. 4, also disclosed herein are embodiments of a method of forming the above-described structures (e.g., the structure 100 of FIG. 1 or the structure 200 of FIG. 2) for implementing a Physically Unclonable Function (PUF)-based random number generator.

Generally, the disclosed embodiments of the method can include providing a semiconductor layer (see process step 402). An array 110, 210 of devices can be formed using the semiconductor layer (see process step 404 and, for example, the structure 100 of FIG. 1 or the structure 200 of FIG. 2). In any case, the devices can all be the same type of device formed according to the same specific design. However, the devices in the array can specifically be formed at process step 404 so that, while values of a performance parameter exhibited by some of the devices in the array 110, 210 (referred to herein as first devices 111, 211) are within a predetermined range (e.g., a range established based on the design of the devices), values of the same performance parameter exhibited by other devices in the array 110, 210 (referred to herein as second devices 112, 212) are outside that predetermined range. Additionally, the devices in the array can specifically be formed such that the above-described first and second devices 111-112, 211-212 are randomly distributed across the array 110, 210. Formation and random distribution of the devices in the array 110, 210 (including the first and second devices 111-112, 211-212) can be achieved, for example, by forming randomly patterned dopant implant regions 120, 220 in the semiconductor layer. The randomly patterned dopant implant regions 120, 220 can be formed before or during device formation. Furthermore, various different techniques can be employed to form the randomly patterned dopant implant regions (as discussed in greater detail below).

For purposes of this disclosure, randomly patterned dopant implant regions refer to dopant implant regions where the sizes (including lengths, widths and potentially depths), shapes, and locations of the dopant implant regions 120 vary (i.e., are non-uniform) as do the separation distances (i.e., spacings) between the dopant implant regions. That is, the dopant implant regions are inconsistently sized, inconsistently shaped and inconsistently spaced with respect to each another and with respect to other components in the structure. Furthermore, the inconsistencies of the sizes, the shapes and the locations of the dopant implant regions are not mirrored or repeated from location to location across the structure but instead are inconsistent for any given length measure.

In any case, devices of an array 110, 210 that end up physically separated from the dopant implant regions 120, 220 can have performance parameter values within a predetermined range such that they are first devices 111, 211, whereas devices in the array 110, 210 that end up having a junction with one or more dopant implant regions 120, 220 (i.e., that end up wholly or partially contained in or containing one or more dopant implant regions) can have performance parameter values that fall outside the predetermined range such that they are second devices 112, 212. Alternatively, the reverse could be true. That is, devices of an array 110, 210 that end up physically separated from the dopant implant regions 120, 220 could have performance parameter values outside the predetermined range such that they are second devices 112, 212, whereas devices in the array 110, 210 that end up having a junction with one or more dopant implant regions 120, 220 (i.e., that end up wholly or partially contained in or containing one or more dopant implant regions) can have performance parameter values that are within the predetermined range such that they are first devices 111, 211.

Figure 5:
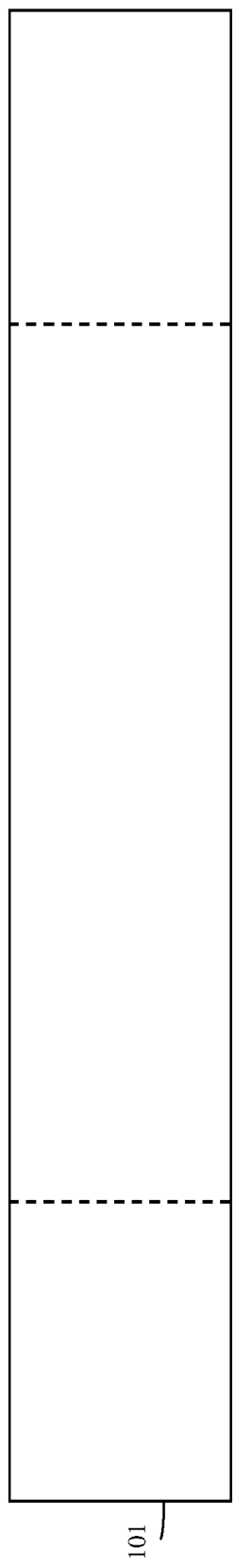
FIGS. 5-9 are cross-section diagrams illustrating partially completed on-chip structures formed according to the flow diagram of FIG. 4 to form the on-chip structure of FIG. 1.

One exemplary method embodiment disclosed herein forms the on-chip structure 100 of FIG. 1. This method embodiment can include providing a semiconductor layer 101 (see process step 402 and FIG. 5). This semiconductor layer 101 can be a bulk monocrystalline semiconductor substrate (e.g., a bulk silicon substrate or any other suitable bulk monocrystalline semiconductor substrate), as shown. Alternatively, this semiconductor layer 101 could be a monocrystalline semiconductor layer (e.g., a monocrystalline silicon layer or any other suitable monocrystalline semiconductor layer) of a semiconductor-on-insulator structure (e.g., a silicon-on-insulator (SOI) structure).

An array 110 of devices and, particularly, an array of field effect transistors (FETs) can be formed using the semiconductor layer 101 (see process step 404). The FETs can be formed according to the same specific design and process flow. This specific design can indicate, for example, the type conductivity (i.e., n-type FET (NFET) or p-type FET (PFET)), source/drain dopant implant concentrations, the channel length, the channel width, etc. Additionally, the FETs in the array can be formed such that the threshold voltage values that are exhibited by some of the FETs in the array 110 (referred to herein as first FETs 111) are within a predetermined threshold voltage range, such that the threshold voltage values that are exhibited by other FETs in the array 110 (referred to herein as second FETs 112) are outside that predetermined threshold voltage range and such that the first and second FETs are distributed randomly throughout the array 110. It should be noted that the threshold voltage range can be predetermined based on the specific design that is used to form the FETs. The outer limits of the predetermined threshold voltage range can be, for example, a lowest threshold voltage associated with a fast device (e.g., a 3 or 6 sigma fast device) formed according to the specific design and a highest threshold voltage associated with a slow device (e.g., a 3 or 6 sigma slow device) formed according to the specific design.

Figure 6:
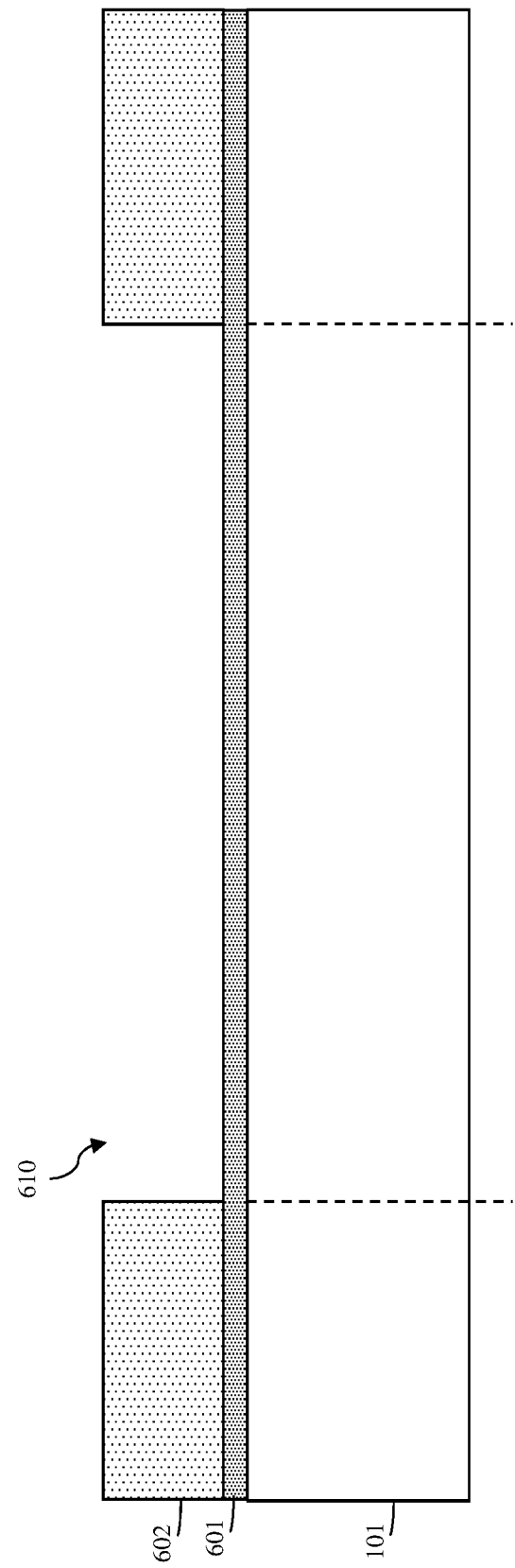

In order to form the array 110 of FETs (including the first and second FETs 111-112, as described above) a first dielectric layer 601 can be formed on the top surface of the semiconductor layer 101 (see process step 411 and FIG. 6). Next, a second dielectric layer 602 can be formed on the first dielectric layer 601 (see process step 412 and FIG. 6). The second dielectric layer 602 can be different from the first dielectric layer 601. For example, in one embodiment, the first dielectric layer 601 can be a silicon nitride layer and the second dielectric layer 602 can be a silicon dioxide layer. An opening 610 can then be formed (e.g., lithographically patterned and etched) such that it extends essentially vertically through the second dielectric layer 602 to the first dielectric layer 601 (see process step 413 and FIG. 6). This opening 610 can specifically be formed so that it defines the limits of an array region in the semiconductor layer 101. That is, the portion of the semiconductor layer 101 that is aligned directly below the opening 610 can be the array region to be used to form the array 110 of devices.

Figure 7A:
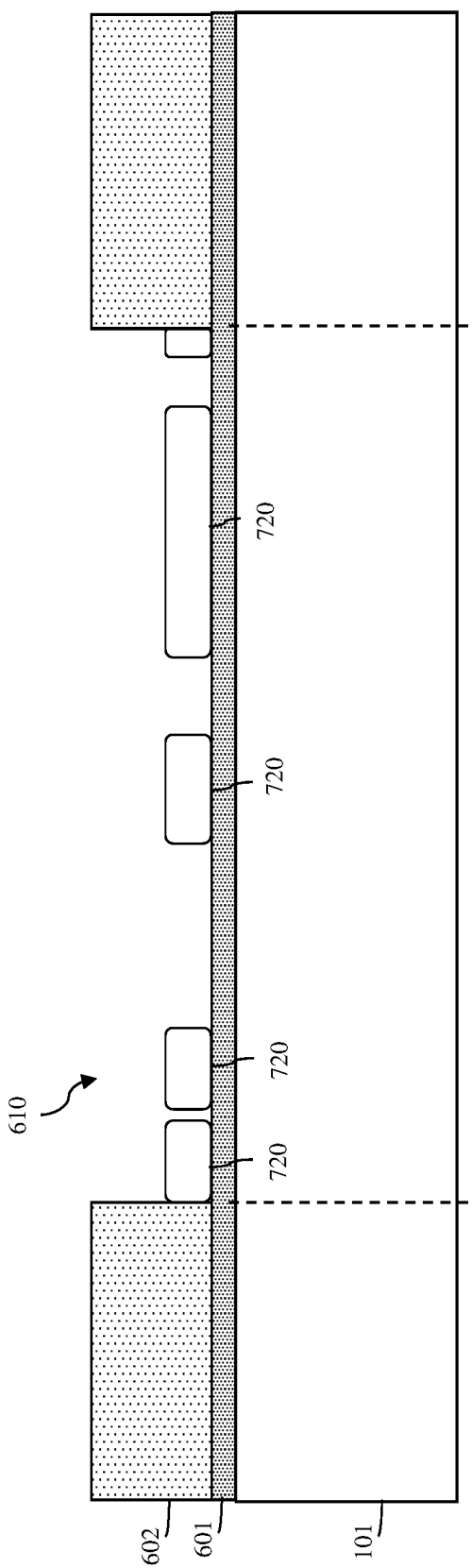
Figure 7B:
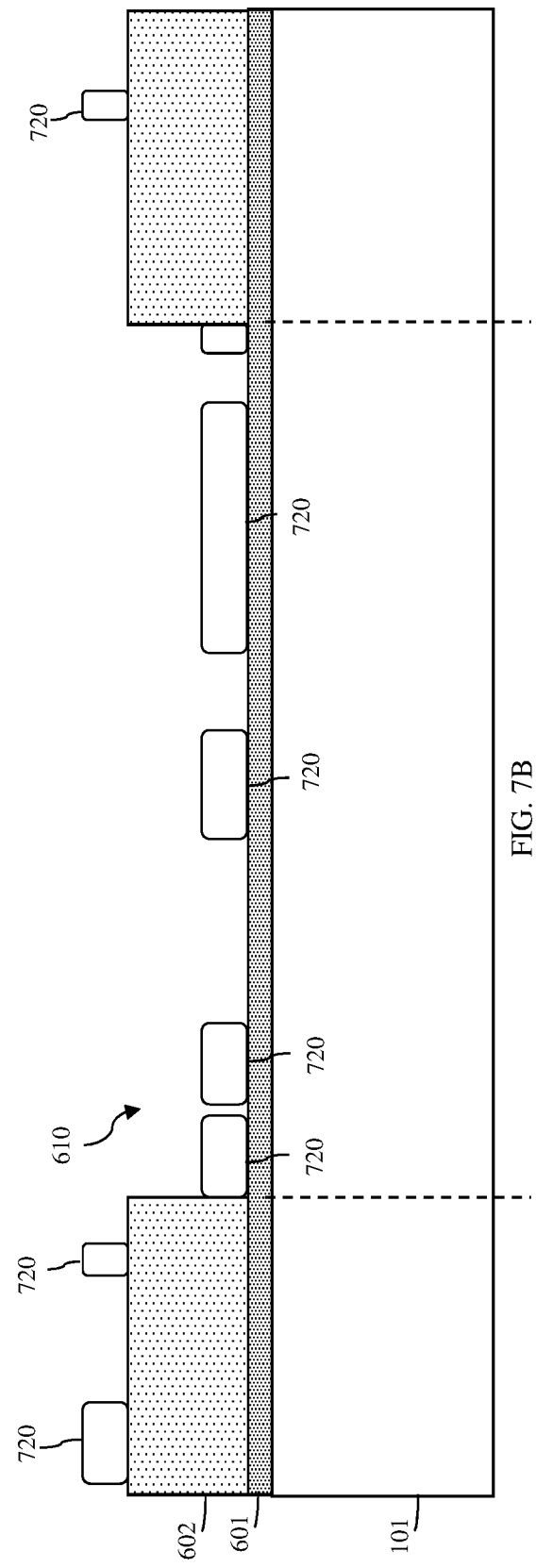
Figure 8:
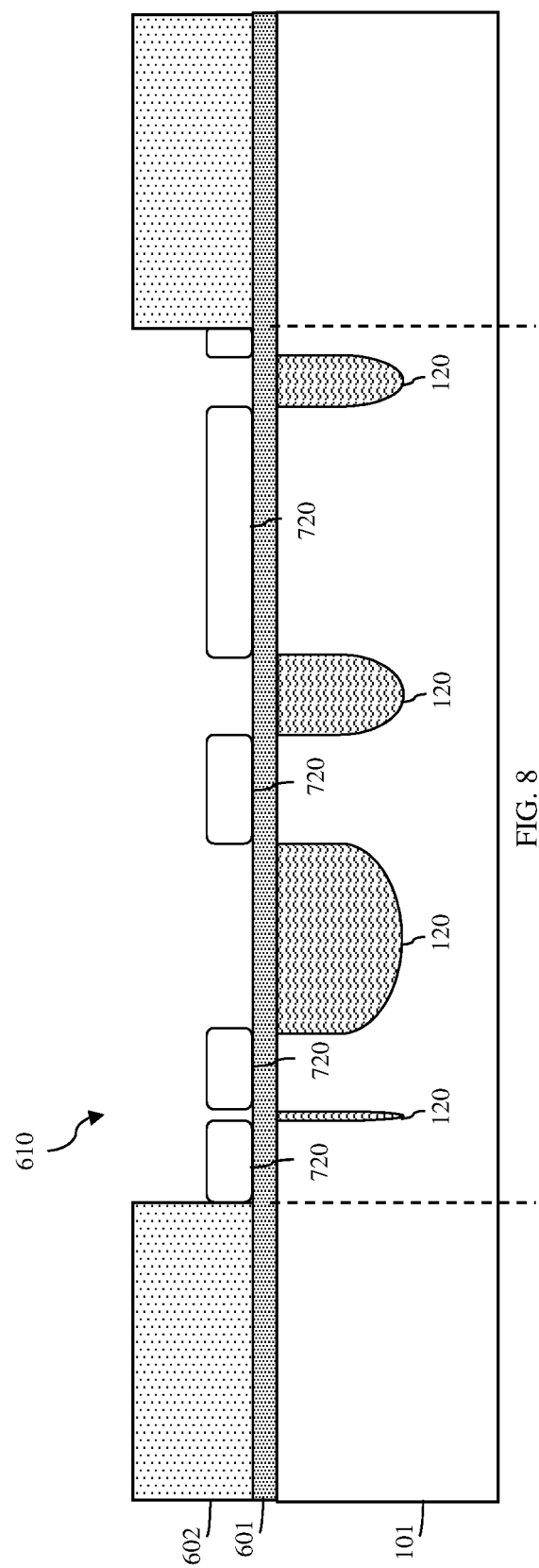

Randomly patterned dopant implant regions 120 can subsequently be formed in this defined array region. To form the randomly patterned dopant implant regions, particles 720 of masking material can be randomly deposited onto the top surface of the first dielectric layer 601 within the opening 610 (see process step 414). For purposes of this disclosure, particles of masking material refer to specks or other minute or relatively small portions of the masking material. Such particles 720 can be randomly deposited by performing an epitaxial semiconductor deposition process that is selective to the second dielectric layer 602 and only partially selective to the first dielectric layer 601 such that the masking material is deposited as the particles 720 on the first dielectric layer 601 within the opening 610 but not on the second dielectric layer 602 (see FIG. 7A). Alternatively, the particles 720 could be randomly deposited onto the surface of the first dielectric layer 601 within the opening 610 by any other suitable technique. Such techniques include, but are not limited to, the following: exposing the opening 610 to an aqueous colloidal suspension; performing a sputter deposition process; and performing an aerosol spray deposition process. Those skilled in the art will recognize that with these techniques the particles 720 of masking material will also be deposited onto exposed surfaces of the second dielectric layer 602, as shown in FIG. 7B. In any case, the randomly deposited particles of the masking material have varying sizes (including lengths, widths and potentially depths), shapes, and locations as well as varying separation distances (i.e., spacings) between particles. That is, the deposited particles of masking material are inconsistently sized, inconsistently shaped and inconsistently spaced with respect to each another and with respect to other components in the structure. Furthermore, the inconsistencies of the sizes, the shapes and the locations of the particles are not mirrored or repeated from location to location. As a result, masked portions of the semiconductor layer are aligned below the particles 720 and unmasked portions are adjacent to the masked portions. Finally, a dopant implantation process can be performed in order to form the dopant implant regions 120 within the unmasked portions of the array region of the semiconductor layer 101 (see process step 415 and FIG. 8).

In some embodiments, the FETs in the array 110 will subsequently be formed according to the specific design so as to have a first type conductivity and the dopant implant regions 120 can be formed so as to have the same first type conductivity. For example, randomly patterned N-type dopant implant regions can be formed when forming NFETs according to a specific design or randomly patterned P-type dopant implant regions can be formed when form PFETs according to a specific design. In other embodiments, the FETs in the array 110 will subsequently be formed according to the specific design so as to have a first type conductivity and the dopant implant regions 120 can be formed so as to have a second type conductivity that is different from the first type conductivity. That is, randomly patterned N-type dopant implant regions can be formed when forming PFETs according to a specific design or randomly patterned P-type dopant implant regions can be formed when form NFETs according to a specific design. Due to the various different mask shapes that are formed from the randomly deposited particles of masking material, the sizes, shapes, and locations of the dopant implant regions 120 will vary (i.e., be non-uniform) within the on-chip structure.

Once the randomly patterned dopant implant regions 120 are formed, the dielectric layers 601-602 and any particles 720 thereon can be removed (e.g., using conventional silicon nitride and silicon dioxide strip techniques). Then, additional processing can be performed in order to complete the FET structures (see process step 416 and FIG. 1). This additional processing can include, but is not limited to, the following: forming shallow trench isolation (STI) regions 125 in the semiconductor layer 101 (e.g., to define the limits of the active regions of the FETs being formed); forming gate structures (G) on designated channel regions; doping source and drain regions (S, D); depositing interlayer dielectric (ILD) material 103; and forming middle of the line (MOL) contacts 104 to nodes of each FET.

Due to the varying sizes, shapes, and locations of the randomly patterned dopant implant regions 120, some FETs within the array 110 (referred to herein as the first FETs 111) will be completely separated from the dopant implant regions 120 such that their threshold voltage values are within the predetermined threshold voltage range and other FETs within the array 110 (referred to herein as second FETs 112) will have junctions with one or more dopant implant regions 120 (i.e., will have all or a portion of their respective channel regions (C) contained within a dopant implant region 120) such that their threshold voltage values fall outside the threshold voltage range.

Figure 9:
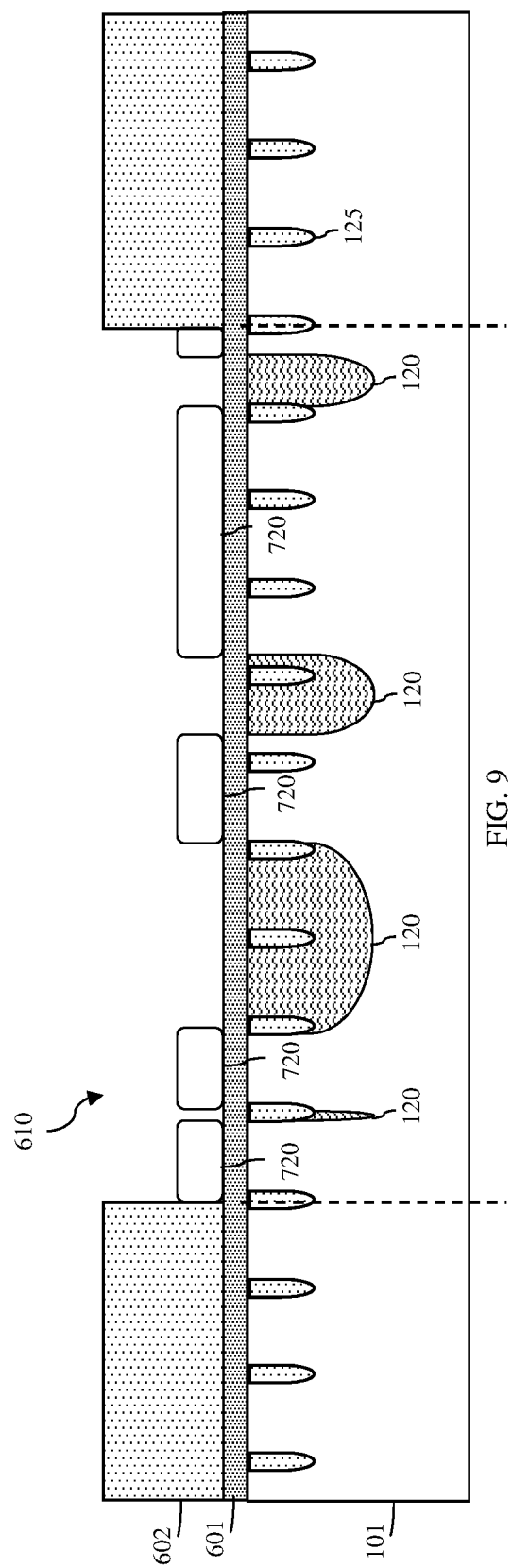

For purposes of illustration, the process of forming the randomly patterned dopant implant regions 120 in the semiconductor layer 101 is shown in the Figures and described above as being performed prior to formation of the STI regions 125 and other FET components (e.g., gate, source/drain regions, etc.). It should be understood that, alternatively, essentially the same process steps could be employed to form the randomly patterned dopant implant regions 120 at some other stage during FET processing. For example, in some embodiments, the randomly patterned dopant implant regions 120 could be formed following STI information (as shown in FIG. 9). In other embodiments, the randomly patterned dopant implant regions could be formed following gate patterning. Those skilled in the art will recognize that dopant implant region that are formed later in the process flow (e.g., after STI or gate formation) will be subjected to less thermal budgeting and, thus, will exhibit less dopant outdiffusion.

Another exemplary method embodiment disclosed herein forms the on-chip structure 200 of FIG. 2, using a similar technique to that described above. However, in this case, the devices are polysilicon resistors, which are illustrated in the Figures and described below as being formed in the same polysilicon layer used to form FET gate structures. Specifically, this method embodiment can include providing a semiconductor layer 201. The semiconductor layer 201 can be a bulk monocrystalline semiconductor substrate (e.g., a bulk silicon substrate or any other suitable bulk monocrystalline semiconductor substrate), as shown. Alternatively, this semiconductor layer 201 could be a monocrystalline semiconductor layer (e.g., a monocrystalline silicon layer or any other suitable monocrystalline semiconductor layer) of a semiconductor-on-insulator structure (e.g., a silicon-on-insulator (SOI) structure). Next, shallow trench isolation (STI) regions 225 can be formed in the semiconductor layer 201. The STI regions 125 can define active device regions in the semiconductor layer 201. Optionally, an STI region 125 can also be formed to provide isolation from an array of devices that will subsequently be formed above the semiconductor layer 201.

Figure 10:
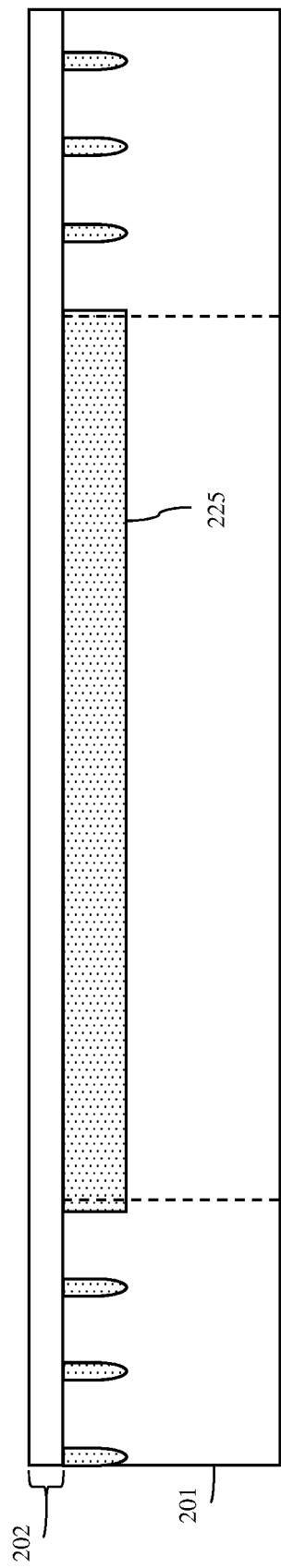
FIGS. 10-13 are cross-section diagrams illustrating partially completed on-chip structures formed according to the flow diagram of FIG. 4 to form the on-chip structure of FIG. 2.

An additional semiconductor layer 202 can then be deposited onto the semiconductor layer 201 and over the STI regions 225 (see process step 402 and FIG. 10). This additional semiconductor layer 202 can be a polysilicon layer. An array 210 of devices and, particularly, an array of polysilicon resistors can subsequently be formed using the polysilicon layer 202 (see process step 404). The polysilicon resistors can all be formed in the polysilicon layer 202 according to the same specific design and process flow. This specific design can indicate, for example, the size of the polysilicon resistors (i.e., length, width, and depth) and any doping. Additionally, the polysilicon resistors can be formed such that the resistance values that are exhibited by some of the resistors in the array 210 (referred to herein as first resistors 211) are within a predetermined resistance range, such that the resistance values that are exhibited by other resistors in the array 210 (referred to herein as second resistors 212) are outside that predetermined resistance range, and such that the first and second resistors are distributed randomly throughout the array 210. It should be noted that the resistance range can be predetermined based on the specific design that is used to form the resistors. The outer limits of the predetermined resistance range can be, for example, lowest and highest resistances associated with polysilicon resistors formed according to the specific design.

Figure 11:
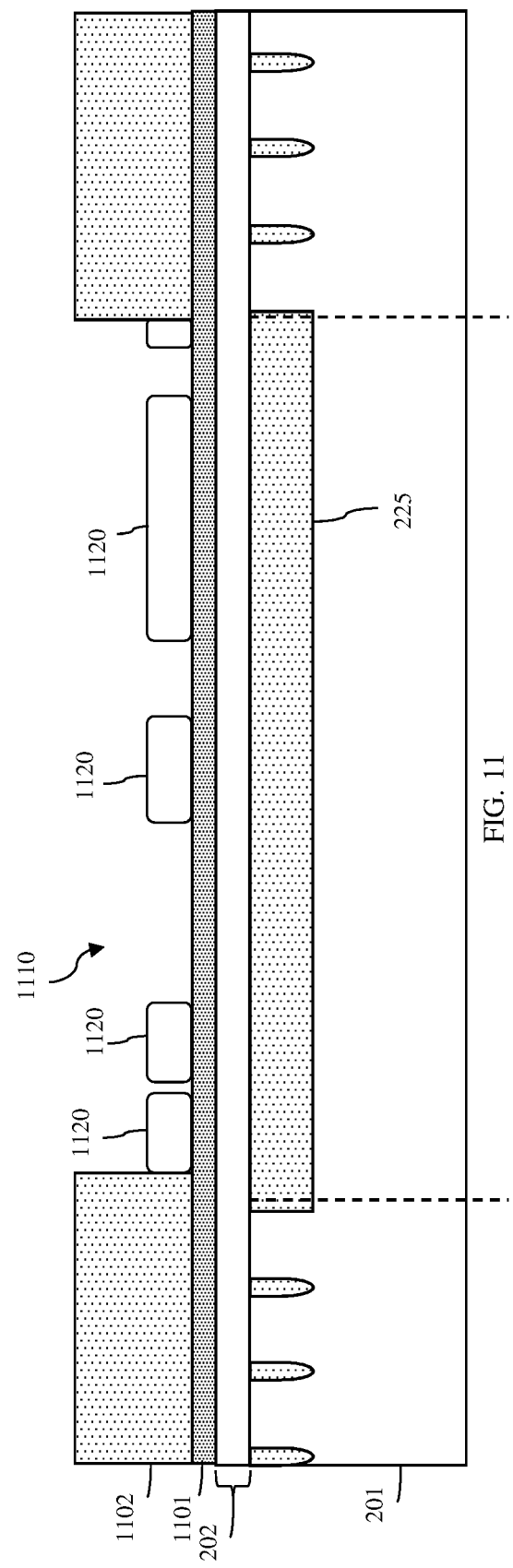

In order to form the array 210 of devices (including the first and second resistors 211-212, as described above) a first dielectric layer 1101 can be formed on the top surface of the polysilicon layer 202 (see process step 411 and FIG. 11). Next, a second dielectric layer 1102 can be formed on the first dielectric layer 1101 (see process step 412 and FIG. 11). The second dielectric layer 1102 can be different from the first dielectric layer 1101. For example, in one embodiment, the first dielectric layer 1101 can be a silicon nitride layer and the second dielectric layer 1102 can be a silicon dioxide layer. An opening 1110 can then be formed (e.g., lithographically patterned and etched) such that it extends essentially vertically through the second dielectric layer 1102 to the first dielectric layer 1101 (see process step 413 and FIG. 11). This opening 1110 can specifically be formed so that it defines the limits of an array region in the polysilicon layer 202.

Depending upon the specific design for the polysilicon resistors, the portion of the polysilicon layer 202 that is aligned below the opening 1110 and that will subsequently be patterned into the polysilicon resistors for the array 210 can be either left undoped (i.e., intrinsic) or can be doped so as to have a given type conductivity and, thus, a given conductivity level or resistivity level.

Figure 12:
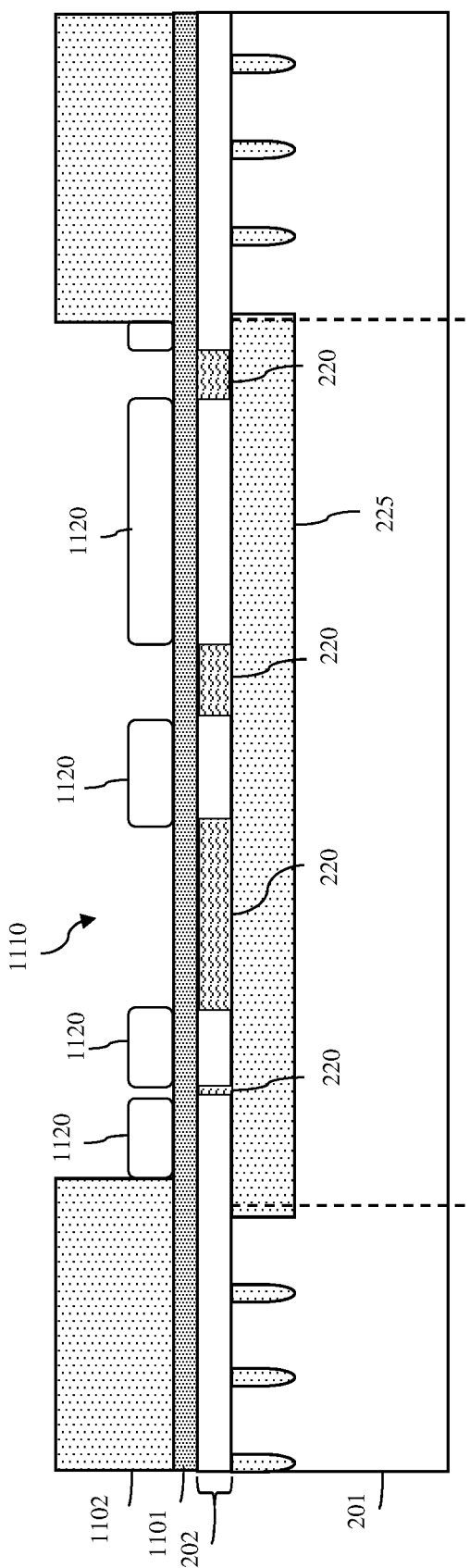

Randomly patterned dopant implant regions 220 can subsequently be formed in the portion of the polysilicon layer 202 that is aligned below the opening 1110. To form the randomly patterned dopant implant regions, particles 1120 of masking material can be randomly deposited onto the top surface of the first dielectric layer 1101 within the opening 1110 (see process step 414). It should be noted that the same techniques discussed above and illustrated in FIGS. 7A and 7B for depositing the particles 720 of masking material could be employed to deposit the particles 1120. A dopant implantation process can then be performed in order to form the randomly patterned dopant implant regions 220 specifically within the unmasked portions of the polysilicon layer layer 202 (see process step 415 and FIG. 12).

In some embodiments, the specific design used can specify that the polysilicon resistors are to be undoped (i.e., intrinsic) and the dopant implant regions 220 can be formed so as to have one type of conductivity or the other (i.e., N-type or P-type). In some embodiments, the specific design used can specify that the polysilicon resistors are to have a first type conductivity and the dopant implant regions 220 can be formed so as to also have the first type conductivity. In some embodiments, the specific design used can specify that the polysilicon resistors are to have a first type conductivity and the dopant implant regions 220 can be formed so as to have a second type conductivity that is different from the first type conductivity. It should be noted that, due to the masks that are formed from the randomly deposited particles of masking material, the sizes, shapes, and locations of the dopant implant regions 220 will vary (i.e., be non-uniform) within the on-chip structure.

Figure 13:
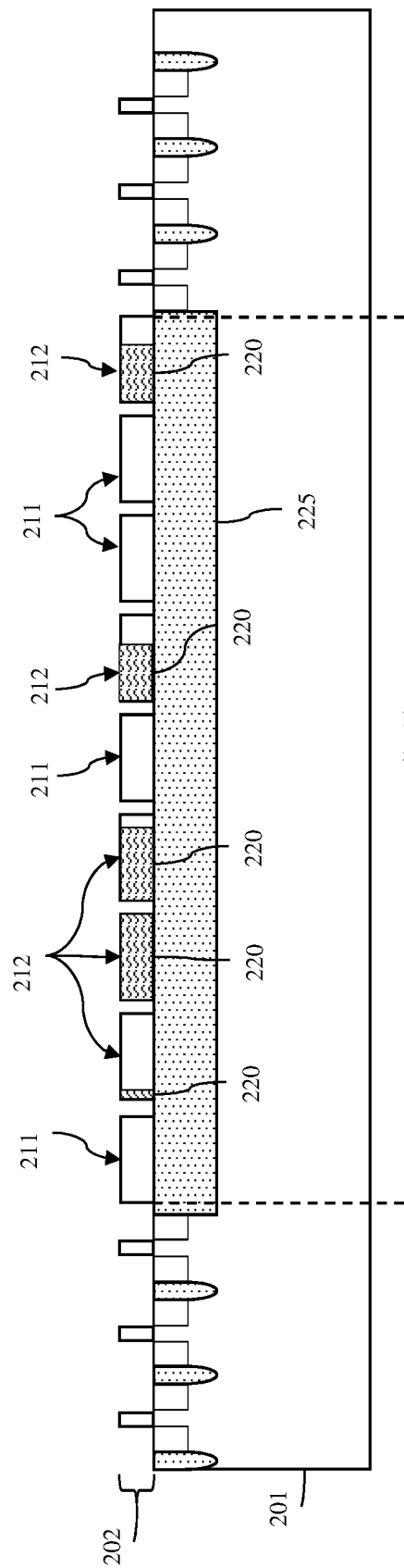

Once the randomly dopant implant regions 220 are formed, the dielectric layers 1101-1102 and any particles 1120 thereon can be removed (e.g., using conventional silicon nitride and silicon dioxide strip techniques). Then, additional processing can be performed in order to complete the polysilicon resistor structures (see process step 416). This additional processing can include lithographic patterning and etching of the polysilicon layer 202 to form the polysilcon resistor shapes. It should be noted that formation of the polysilicon resistor shapes can be performed concurrently with formation of polysilicon gates for other on-chip components 290 (e.g., for transistors in logic blocks, etc.) using the same polysilicon layer 202 in other regions of the on-chip structure (see FIG. 12). Additional processing can also include depositing interlayer dielectric (ILD) material 203 and forming middle of the line (MOL) contacts 204 to nodes of each polysilicon resistor (see FIG. 13).

Due to the varying sizes, shapes, and locations of the dopant implant regions 220, some polysilicon resistors within the array 210 (referred to herein as the first resistors 211) will be completely separated from the dopant implant regions 220 such that their resistance values are within the predetermined resistance range and other polysilicon resistors within the array 210 (referred to herein as second resistors 212) will have junctions with one or more dopant implant regions 220 (i.e., will contain all or a portion of a dopant implant region) such that their resistance values fall outside the resistance range.

It should be understood that arrays 110, 210 formed at process step 404 and shown in the drawings are provided for illustration purposes and are not intended to be limiting. Other embodiments of the method could include forming arrays of other devices (e.g., diodes, other types of transistors, capacitors, etc. as opposed to FETs or resistors) as long as performance parameter values of random ones of the devices could be significantly altered due to the randomly patterned dopant implant regions form at process steps 414-416.

Referring again to the flow diagram of FIG. 4, the method embodiments can further include forming a random number generator 150, 250 (see process step 406 and FIG. 3). This random number generator 150, 250 can be formed so that it is operably connected to the array 110, 210 of devices (e.g., via the MOL contacts 104, 204 and upper level wiring (not shown). This random number generator 150, 250 can further be formed so that it is configured to take advantage of the significantly different performance parameter values of the first and second devices (which, as discussed above, are randomly distributed) in order to generate a PUF-based random multi-bit binary number. Such random number generators are well known in the art and, thus, the details thereof have been omitted from this specification in order to allow the reader to focus on the salient aspects of the disclosed embodiments. In any case, the random multi-bit binary number generated by the random number generator 150, 250 can be repeatedly and consistently generated (i.e., stable, always the same and not re-writable) (not because of the random number generator itself) but rather because in the disclosed method embodiments formation of the randomly patterned dopant implant regions 120, 220 in the array region ensures that the differences in the performance parameter values exhibited by the first and second devices 111-112, 211-212 (which are randomly distributed across the array 110, 210) will be significantly large and, thereby ensures that the state of each device will remain the same (i.e., first devices 111, 211 will remain first devices and second devices 112, 212 will remain second devices 112) and readily detectable even with variations in temperature and/or voltage conditions. Thus, the random multi-bit binary number can be employed as a random key (i.e., a random code) for cryptography (e.g., encryption and decryption), for advanced authentication, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Additionally, it should be understood that in the structures and methods described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and gallium nitride-based semiconductor materials. A pure semiconductor material and, more particularly, a semiconductor material that is not doped with an impurity for the purposes of adjusting conductivity (i.e., an undoped semiconductor material) is referred to in the art as an intrinsic semiconductor. A semiconductor material that is doped with an impurity for the purposes of adjusting conductivity (i.e., a doped semiconductor material) is referred to in the art as an extrinsic semiconductor. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity or silicon (Si) to achieve N-type conductivity. Those skilled in the art will also recognize that different conductivity levels will depend upon the relative concentration levels of the dopant(s) in a given semiconductor region.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a semiconductor layer;
   randomly patterned dopant implant regions in the semiconductor layer; and
   a physically unclonable function comprising an array of devices,
   wherein the devices comprise corresponding regions of the semiconductor layer and include first devices and second devices different from the first devices,
   wherein the corresponding regions of the semiconductor layer of the first devices are devoid of any of the randomly patterned dopant implant regions extending vertically therethrough and the first devices have performance parameter values within a predetermined range,
   wherein the corresponding regions of the semiconductor layer of the second devices each have at least a portion of at least one randomly patterned dopant implant region extending vertically therethrough with junctions between the randomly patterned dopant implant regions and the second devices causing the second devices to have performance parameter values outside the predetermined range, and
   wherein the first devices and the second devices are randomly distributed across the array.

2. The structure of claim 1,
   wherein the randomly patterned dopant implant regions have varying sizes and non-uniformseparation distances.

3. The structure of claim 2,
wherein the devices in the array comprise field effect transistors with each corresponding region of the semiconductor layer of each field effect transistor including a channel region positioned laterally between a source region and a drain region,
wherein each corresponding region of the semiconductor layer of each first device is devoid of any junctions between the source region, the channel region, and the drain region therein and any of the randomly patterned dopant implant regions,
wherein each corresponding region of the semiconductor layer of each second device has a junction between at least one of the source region, the channel region, and the drain region therein and at least one of the randomly patterned dopant implant regions,
wherein the performance parameter values comprise threshold voltage values,
wherein the predetermined range comprises a predetermined threshold voltage range based on a specific design for the field effect transistors, and
wherein the randomly patterned dopant implant regions cause the threshold voltage values of the second devices to fall outside the predetermined threshold voltage range.

4. The structure of claim 3, wherein the predetermined threshold voltage range extends from a lowest threshold voltage of a fast field effect transistor to a highest threshold voltage of a slow field effect transistor.

5. The structure of claim 3, wherein the field effect transistors and the dopant implant regions have a first type conductivity.

6. The structure of claim 3, wherein the field effect transistors have a first type conductivity and the dopant implant regions have a second type conductivity that is different from the first type conductivity.

7. The structure of claim 2,
wherein the devices in the array comprise resistors,
wherein the performance parameter values comprise resistance values,
wherein the predetermined range comprises a predetermined resistance range based on a specific design for the resistors, and
wherein the randomly patterned dopant implant regions cause the resistance values of the second devices to fall outside the predetermined resistance range.

8. A structure comprising:
a semiconductor layer;
randomly patterned dopant implant regions in the semiconductor layer;
an array of devices,
wherein the devices comprise corresponding regions of the semiconductor layer and include first devices and second devices different from the first devices,
wherein the corresponding regions of the semiconductor layer of the first devices are devoid of any of the randomly patterned dopant implant regions extending vertically therethrough and the first devices have performance parameter values within a predetermined range,
wherein the corresponding regions of the semiconductor layer of the second devices each have at least a portion with at least one randomly patterned dopant implant region extending vertically therethrough with junctions between the randomly patterned dopant implant regions and the second devices causing the second devices to have performance parameter values outside the predetermined range, and
wherein the first devices and the second devices are randomly distributed across the array; and
a random number generator operably connected to the array of devices and generating a random number based on distribution of the first devices and the second devices within the array.

9. The structure of claim 8,
wherein the randomly patterned dopant implant regions have varying sizes and non-uniform separation distances.

10. The structure of claim 9,
wherein the devices in the array comprise field effect transistors with each corresponding region of the semiconductor layer of each field effect transistor including a channel region positioned laterally between a source region and a drain region,
wherein each corresponding region of the semiconductor layer of each first device is devoid of any junctions between the source region, the channel region, and the drain region therein and any of the randomly patterned dopant implant regions,
wherein each corresponding region of the semiconductor layer of each second device has a junction between at least one of the source region, the channel region, and the drain region therein and at least one of the randomly patterned dopant implant regions,
wherein the performance parameter values comprise threshold voltage values,
wherein the predetermined range comprises a predetermined threshold voltage range based on a specific design for the field effect transistors, and
wherein the randomly patterned dopant implant regions cause the threshold voltage values of the second devices to fall outside the predetermined threshold voltage range.

11. The structure of claim 10, wherein the predetermined threshold voltage range extends from a lowest threshold voltage of a fast field effect transistor to a highest threshold voltage of a slow field effect transistor.

12. A method comprising:
providing a semiconductor layer;
forming randomly patterned dopant implant regions in the semiconductor layer; and
forming a physically unclonable function comprising an array of devices,
wherein the devices comprise corresponding regions of the semiconductor layer and include first devices and second devices different from the first devices,
wherein the corresponding regions of the semiconductor layer of the first devices are devoid of any of the randomly patterned dopant implant regions extending vertically therethrough and the first devices have performance parameter values within a predetermined range,
wherein the corresponding regions of the semiconductor layer of the second devices each have at least a portion of at least one randomly patterned dopant implant region extending vertically therethrough with junctions between the randomly patterned dopant implant regions and the second devices causing the second devices to have performance parameter values outside the predetermined range, and
wherein the first devices and the second devices are randomly distributed across the array.

13. The method of claim 12, wherein the forming of the randomly patterned dopant implant regions includes randomly depositing particles of a masking material above a surface of the semiconductor layer so that, following the randomly depositing of the particles, the semiconductor layer has masked portions that are aligned below groups of one or more of the particles and unmasked portions that are exposed around and between the masked portions, wherein the groups of one or more of the particles have varying sizes and non-uniform separation distances.

14. The method of claim 13, wherein the forming of the randomly patterned dopant implant regions further includes
performing a dopant implantation process to form the randomly patterned dopant implant regions in the unmasked portions of the semiconductor layer, wherein, given that the groups of one or more of the particles have varying sizes and non-uniform separation distances, the randomly patterned dopant implant regions have varying sizes and non-uniform separation distances; and
removing the particles.

15. The method of claim 14, wherein the forming of the randomly patterned dopant implant region further comprises:
before the randomly depositing of the particles of the masking material, forming a first dielectric layer on the surface of the semiconductor layer;
forming a second dielectric layer on the first dielectric layer, wherein the second dielectric layer is different from the first dielectric layer;
forming an opening that extends through the second dielectric layer to the first dielectric layer, wherein the opening defines an array region in the semiconductor layer for the array of devices; and
performing any of the following in order to randomly deposit the particles of the masking material onto the first dielectric layer within the opening:
performing an epitaxial semiconductor deposition process, wherein the epitaxial semiconductor deposition process is selective to the second dielectric layer and only partially selective to the first dielectric layer such that the masking material is only deposited as the particles on the first dielectric layer within the opening;
exposing the opening to an aqueous colloidal suspension;
performing a sputter deposition process; and
performing an aerosol spray deposition process.

16. The method of claim 12, wherein the forming of the array of devices comprises forming an array of field effect transistors according to a specific design, with each corresponding region of the semiconductor layer of each field effect transistor including a channel region positioned laterally between a source region and a drain region,
wherein each corresponding region of the semiconductor layer of each first device is devoid of any junctions between the source region, the channel region, and the drain region therein and any of the randomly patterned dopant implant regions,
wherein each corresponding region of the semiconductor layer of each second device has a junction between at least one of the source region, the channel region, and the drain region therein and at least one of the randomly patterned dopant implant regions,
wherein the performance parameter values comprises threshold voltage values,
wherein the predetermined range comprises a predetermined threshold voltage range based on the specific design, and
wherein the randomly patterned dopant implant regions cause the threshold voltage values of the second devices to fall outside the predetermined threshold voltage range.

17. The method of claim 16, wherein the predetermined threshold voltage range extends from a lowest threshold voltage of a fast field effect transistor to a highest threshold voltage of a slow field effect transistor.

18. The method of claim 16, wherein the field effect transistors and the dopant implant regions are formed so as to have a first type conductivity.

19. The method of claim 16, wherein the field effect transistors are formed so as to have a first type conductivity and the dopant implant regions are formed so as to have a second type conductivity that is different from the first type conductivity.

20. The method of claim 12,
wherein the forming of the array of devices comprises forming an array of resistors,
wherein the performance parameter values comprises resistance values,
wherein the predetermined range comprises a predetermined resistance range based on a specific design for the resistors, and
wherein the randomly patterned dopant implant regions cause the resistance values of the second devices to fall outside the predetermined resistance range.

* * * * *